United States Patent
Wang

(10) Patent No.: US 10,424,439 B2
(45) Date of Patent: Sep. 24, 2019

(54) CAPACITOR FOR INVERTER OF ELECTRIFIED VEHICLE AND ASSOCIATED METHOD

(71) Applicant: Ford Global Technologies, LLC, Dearborn, MI (US)

(72) Inventor: Miao Wang, Columbus, OH (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/783,041

(22) Filed: Oct. 13, 2017

(65) Prior Publication Data

US 2019/0115155 A1    Apr. 18, 2019

(51) Int. Cl.
| | | |
|---|---|---|
| H01G 4/258 | (2006.01) | |
| B60L 3/00 | (2019.01) | |
| B60L 15/00 | (2006.01) | |
| H02M 1/14 | (2006.01) | |

(52) U.S. Cl.
CPC ............. *H01G 4/258* (2013.01); *B60L 3/0061* (2013.01); *B60L 15/007* (2013.01); *H02M 1/143* (2013.01)

(58) Field of Classification Search
CPC ..... H01G 4/258; B60L 3/0061; B60L 15/007; H02M 1/143
USPC ...................................................... 361/274.2
See application file for complete search history.

(56) References Cited

U.S. PATENT DOCUMENTS

| | | | |
|---|---|---|---|
| 4,315,299 A * | 2/1982 | Saint Marcoux | ........ H01G 2/08 361/274.2 |
| 6,166,937 A | 12/2000 | Yamamura et al. | |
| 8,780,557 B2 | 7/2014 | Duppong et al. | |
| 9,445,532 B2 | 9/2016 | Chen et al. | |
| 9,581,234 B2 | 2/2017 | Sung et al. | |
| 2008/0117602 A1 | 5/2008 | Korich et al. | |
| 2009/0154101 A1 | 6/2009 | Korich et al. | |
| 2017/0215304 A1* | 7/2017 | Tokuyama | .............. H01L 23/36 |

OTHER PUBLICATIONS

Kelly, K.J., et al., Assessment of Thermal Control Technologies for Cooling Electric Vehicle Power Electronics, National Renewable Energy Laboratory, Conference Paper, Jan. 2008, p. 1-17.
Kim, Sung Chul, Thermal Performance of Motor and Inverter in an Integrated Stater Generator System for a Hybrid Electric Vehicle, Energies 2013, Nov. 22, 2013, p. 6102-6119, vol. 6.

* cited by examiner

*Primary Examiner* — Michael P McFadden
(74) *Attorney, Agent, or Firm* — Carlson, Gaskey & Olds, P.C.

(57) ABSTRACT

An electrified vehicle according to an exemplary aspect of the present disclosure includes, among other things, an electric machine electrically coupled to a battery pack through an inverter. Further, the inverter includes a capacitor with an internal cooling channel. A method is also disclosed.

8 Claims, 4 Drawing Sheets

CAPACITOR FOR INVERTER OF ELECTRIFIED VEHICLE AND ASSOCIATED METHOD

TECHNICAL FIELD

This disclosure relates to a capacitor for an inverter of an electrified vehicle.

BACKGROUND

The desire to reduce automotive fuel consumption and emissions is well known. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage battery pack typically powers the electric machines and other electrical loads of the electrified vehicle. Electric machines are typically coupled to the battery pack by way of an inverter. Inverters are known to include capacitors that smooth changes in voltage.

SUMMARY

An electrified vehicle according to an exemplary aspect of the present disclosure includes, among other things, an electric machine electrically coupled to a battery pack through an inverter. Further, the inverter includes a capacitor with an internal cooling channel.

In a further non-limiting embodiment of the foregoing electrified vehicle, the internal cooling channel is located interiorly of an exterior of the capacitor.

In a further non-limiting embodiment of any of the foregoing electrified vehicles, the capacitor includes capacitor bulk located interiorly of the internal cooling channel.

In a further non-limiting embodiment of any of the foregoing electrified vehicles, the capacitor includes an inlet and an outlet, and the internal cooling channel is configured to direct fluid from the inlet to the outlet.

In a further non-limiting embodiment of any of the foregoing electrified vehicles, the internal cooling channel has a width dimension and a height dimension. The height dimension is greater than the width.

In a further non-limiting embodiment of any of the foregoing electrified vehicles, the electrified vehicle includes a source of cooling fluid fluidly coupled to the inlet.

In a further non-limiting embodiment of any of the foregoing electrified vehicles, the exterior of the capacitor includes a front face, a rear face, first and second sides, a top, and a bottom. Further, the inlet and the outlet are formed in the front face.

In a further non-limiting embodiment of any of the foregoing electrified vehicles, the front and rear faces have an increased dimension relative to the first and second sides.

In a further non-limiting embodiment of any of the foregoing electrified vehicles, the internal cooling channel is concentric with a perimeter of the capacitor.

In a further non-limiting embodiment of any of the foregoing electrified vehicles, the internal cooling channel includes a plurality of segments, and each segment is parallel to an adjacent one of the front face, rear face, first side, and second side.

In a further non-limiting embodiment of any of the foregoing electrified vehicles, each of the plurality of segments is spaced-apart from the exterior of the capacitor by an amount substantially equal to a thickness of the internal cooling channel.

In a further non-limiting embodiment of any of the foregoing electrified vehicles, the amount is constant about substantially the entirety of the capacitor.

In a further non-limiting embodiment of any of the foregoing electrified vehicles, the capacitor includes a plurality of bus bars.

A capacitor for an inverter of an electrified vehicle according to an exemplary aspect of the present disclosure includes, among other things, an internal cooling channel.

In a further non-limiting embodiment of the foregoing capacitor, a capacitor bulk is located interiorly of the internal cooling channel, and the internal cooling channel is located interiorly of an exterior of the capacitor.

In a further non-limiting embodiment of any of the foregoing capacitors, the capacitor includes an inlet and an outlet. The internal cooling channel is configured to direct fluid from the inlet to the outlet.

In a further non-limiting embodiment of any of the foregoing capacitors, the exterior of the capacitor includes a front face, a rear face, first and second sides, a top, and a bottom. Further, the internal cooling channel includes a plurality of segments, and each segment is parallel to an adjacent one of the front face, rear face, first side, and second side.

A method according to an exemplary aspect of the present disclosure includes, among other things, cooling a capacitor of an inverter for an electrified vehicle by directing fluid through an internal cooling channel of the capacitor.

In a further non-limiting embodiment of the foregoing method, the cooling step includes directing fluid through a plurality of segments of the internal cooling channel. Further, each of the plurality of segments extends in a direction substantially parallel to an adjacent surface of the exterior of the capacitor.

In a further non-limiting embodiment of any of the foregoing methods, each of the plurality of segments is spaced-apart from the adjacent surface of the exterior of the capacitor by an amount substantially equal to a thickness of the internal cooling channel.

DETAILED DESCRIPTION

This disclosure relates to a capacitor for an inverter of an electrified vehicle. In one example, an electrified vehicle includes an electric machine electrically coupled to a battery pack through an inverter, and the inverter includes a capacitor with an internal cooling channel. Providing the capacitor with an internal cooling channel allows for increased cooling, which increases the output power of the capacitor and, in turn, increases the power density of the inverter.

Figure 1:
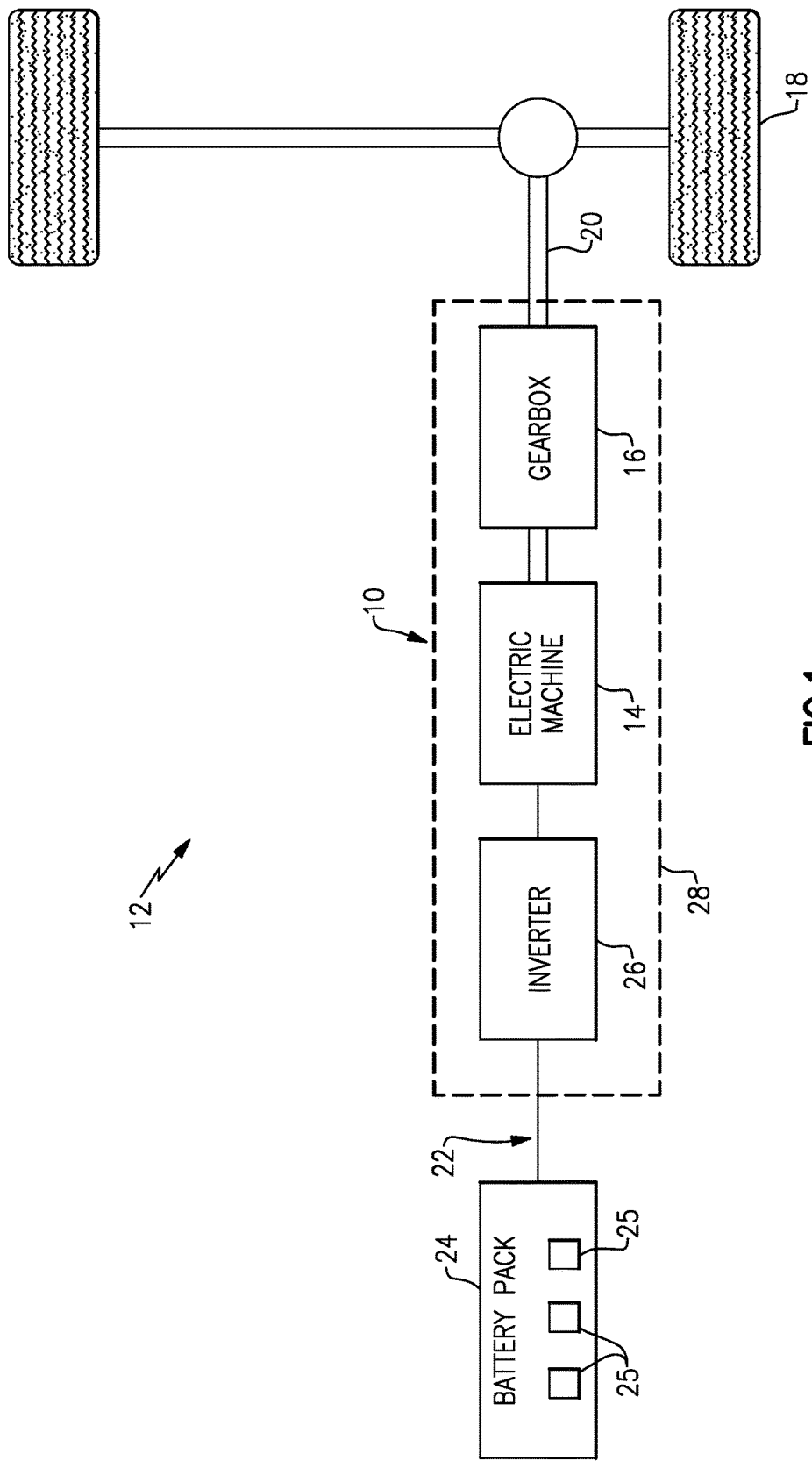
FIG. 1 schematically illustrates a powertrain of an electrified vehicle.

FIG. 1 schematically illustrates a powertrain 10 of an electrified vehicle 12. Although depicted as a battery electric vehicle (BEV), it should be understood that the concepts described herein are not limited to BEVs and could extend to other electrified vehicles, including but not limited to, plug-in hybrid electric vehicles (PHEVs). Therefore, although not shown in this non-limiting embodiment, the electrified vehicle 12 could be equipped with an internal combustion engine that can be employed either alone or in combination with other energy sources to propel the electrified vehicle 12.

In a non-limiting embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 through an inverter 26. The electric machine 14, the gearbox 16, and the inverter 26 may collectively be referred to as a transmission 28. The inverter 26 is known to include one or more capacitors, such as that described relative to FIGS. 2 and 3. It should be understood that this disclosure is not limited to capacitors for the inverter 26, and extends to capacitors used elsewhere in the vehicle 12.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the electric machine 14 and/or other electrical loads of the electrified vehicle 12. Other types of energy storage devices and/or output devices can also be used to electrically power the electrified vehicle 12. The energy storage devices (e.g., battery cells) of the battery pack 24 may be periodically charged. To this end, the energy storage devices may be selectively coupled to a charging station which is in turn connected to an external power source for receiving and distributing power to the energy storage devices.

The powertrain 10 shown in FIG. 1 is highly schematic and is not intended to limit this disclosure. In this respect, it should be understood that certain aspects of the powertrain 10 are exaggerated in the Figures for purposes of illustration only. Various additional components could alternatively or additionally be employed by the powertrain 10 within the scope of this disclosure.

Figure 2:
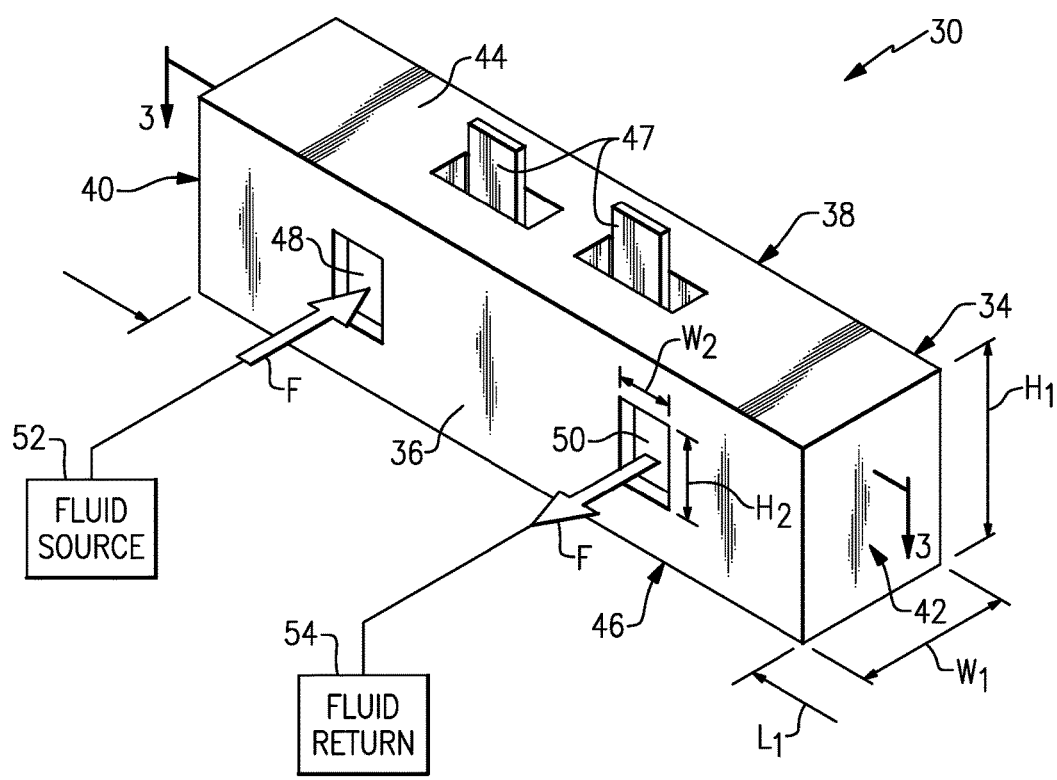
FIG. 2 is a perspective view of a capacitor.

FIG. 2 is a perspective view of an example capacitor 30 according to this disclosure. The capacitor 30 may be part of the inverter 26, in one example, and functions to smooth changes in voltage. During use, the capacitor 30 generates significant heat. The amount of ripple current that the capacitor 30 can handle is limited by the maximum-allowable operating temperature of the capacitor 30. In this disclosure, the capacitor 30 includes an internal cooling channel 32 (FIG. 3), which directs fluid F within the capacitor 30 to thermally condition the capacitor. Specifically, the fluid F cools the capacitor 30, which allows for increased ripple current handling, and which, in turn, increases the power density of the inverter 26.

The capacitor 30 has an exterior 34 with a generally rectangular prismatic shape. In this example, the exterior 34 includes a front face 36, a rear face 38, a first side 40, a second side 42, a top 44, and a bottom 46. The capacitor 30 has a length $L_1$, a width $W_1$, and a height $H_1$, and the surfaces of the exterior 34 are oriented substantially at right angles. The length $L_1$ is substantially greater than the width $W_1$ and height $H_1$, in this example, but it should be understood that this disclosure is not limited to any particular exterior dimensions. Further, in this example, the capacitor 30 includes bus bars 47 projecting from the top 44. The bus bars 47 are configured to electrically couple the capacitor 30 to various other components of the inverter 26.

An inlet 48 and an outlet 50 are formed through the exterior 34, and are configured to direct fluid F to and from the internal cooling channel 32. The inlet 48 and the outlet 50 may be formed through a common surface of the exterior 34. In this example, the inlet 48 and outlet 50 are formed in the front face 36. It should be understood that the inlet 48 and outlet 50 can be formed through other surfaces of the exterior 34. With reference to the outlet 50, the inlet 48 and outlet 50 are substantially rectangular in shape, each having a width $W_2$ and a height $H_2$. In one example, the height $H_2$ is greater than the width $W_2$, but it should be understood that this disclosure extends to other dimensions.

The inlet 48 is fluidly coupled to a fluid source 52. The fluid source 52 may be the same fluid source used to direct cooling fluid to other components of the inverter 26, such as power cards or power modules, as examples. The fluid source 52 could alternatively be a separate source of fluid dedicated to the capacitor 30. The fluid source 52 may provide any type of known fluid F to the inlet 48. After flowing through the internal cooling channel 32, the fluid F absorbs heat from the capacitor 30, and returns to a fluid return 54. The fluid return 54 could be the same fluid return used by the other fluid-cooled components of the inverter 26.

Figure 3:
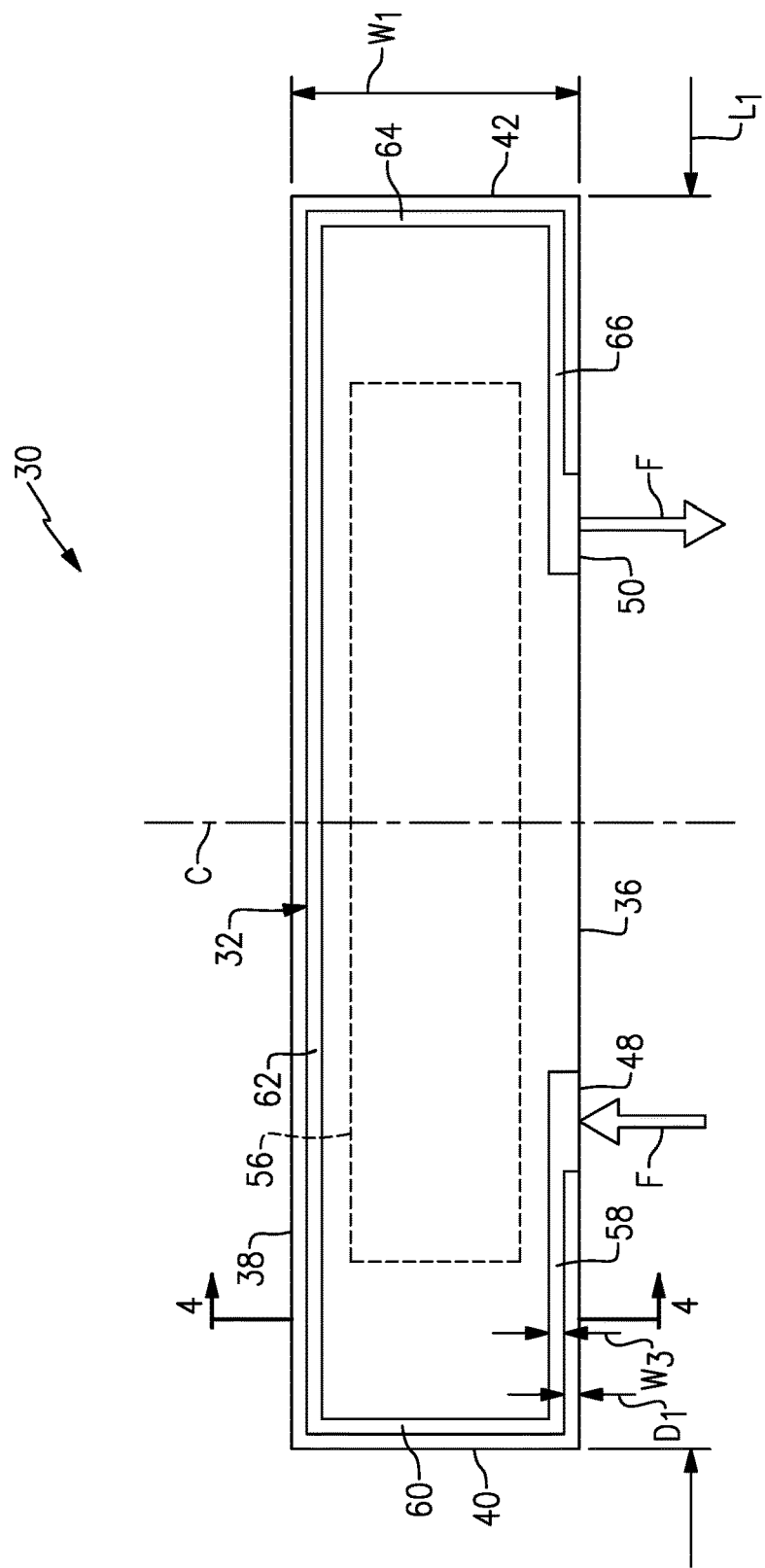
FIG. 3 is a cross-sectional view of the capacitor of FIG. 2 taken along lines 3-3.

FIG. 3 is a cross-sectional view of the capacitor 30 taken along line 3-3 from FIG. 2. FIG. 3 illustrates a capacitor bulk 56 (shown in phantom) which is located interiorly of the internal cooling channel 32. In this disclosure, the term capacitor bulk refers to various components known to be associated with capacitors, such as capacitor cells, lead frames, etc. In one example, the capacitor bulk is an off-the-shelf capacitor. The capacitor 30, in one example, is a thin film capacitor, and the capacitor bulk 56 includes components known to correspond to thin film capacitors.

In general, the internal cooling channel 32 and the exterior 34 of the capacitor are formed by overmolding the capacitor bulk 56. Overmolding is the process of adding material over already-existing pieces or parts (e.g., the capacitor bulk 56) using a molding process. The result is an integrated component including the original piece or pieces and the additional material added via the overmolding process. While overmolding is contemplated herein, this disclosure extends to other manufacturing techniques.

With joint reference to FIGS. 2 and 3, the detail of the internal cooling channel 32 will now be described. The internal cooling channel 32, in this example, is entirely enclosed by the exterior 34. Specifically, the internal cooling channel 32 is enclosed by overmolding of the capacitor bulk 56. Further, the internal cooling channel 32 is located interiorly of the exterior 34 of the capacitor 30. In this way, the fluid F flowing through the internal cooling channel 32 flows relatively close to the capacitor bulk 56, and thus absorbs a relatively large amount of heat from the capacitor bulk 56.

Figure 4:
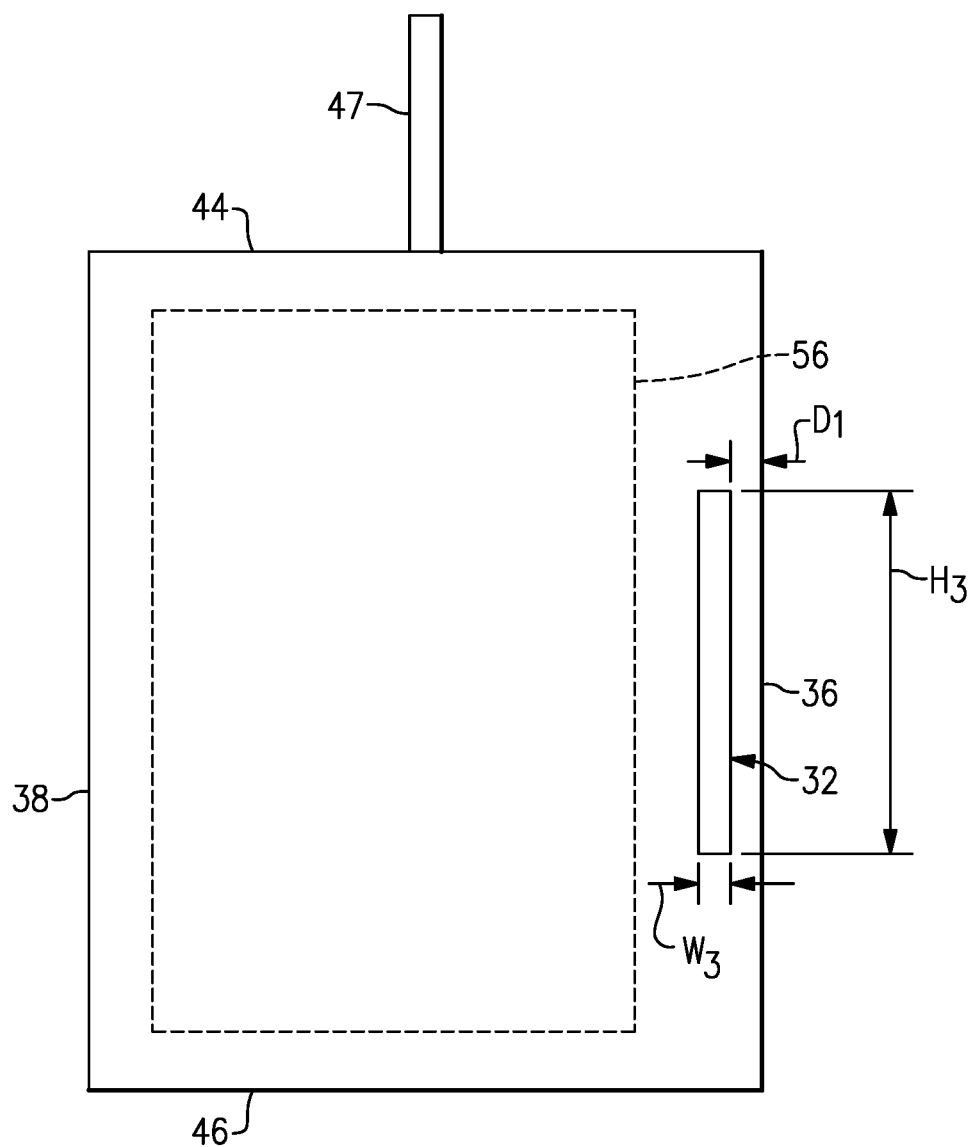
FIG. 4 is a cross-sectional view of the capacitor of FIG. 3 taken along lines 4-4.

In this example, the internal cooling channel 32 is relatively tall and thin. In particular, the internal cooling channel 32 has a height $H_3$ (FIG. 4) substantially equal to the height $H_2$, and a width $W_3$ less than the height $H_3$. Further, in one example, the internal cooling channel 32 is spaced-apart from an adjacent surface of the exterior 34 by an amount, represented by the distance $D_1$, substantially equal to the width $W_3$. The distance $D_1$ remains constant about substantially the entire internal cooling channel 32. The dimensions and arrangement of the internal cooling channel 32 allow sufficient flow of the fluid F (e.g., to effectively condition the capacitor), without providing a capacitor that is unduly large.

In this example, the internal cooling channel 32 is made of a number of interconnected segments. The segments are arranged such that the internal cooling channel 32 is symmetrical about a centerline C, which bisects the capacitor 30 in a direction perpendicular to the length $L_1$. Further, the segments are substantially parallel to an adjacent surface of the exterior 34, such that the internal cooling channel 32 and the perimeter of the exterior 34 are concentric.

Beginning adjacent the inlet 48, the internal cooling channel 32 includes a first segment 58 extending from the inlet 48 to a point adjacent the first side 40 of the capacitor 30. The first segment 58 extends substantially parallel to the front face 36. Downstream of the first segment 58, the internal cooling channel 32 includes a second segment 60 arranged perpendicular to the first segment 58, and extending parallel to the first side 40. A third segment 62 adjoins the second segment 60 and is perpendicular to the second segment 60. The third segment 62 extends in a direction parallel to the rear face 38, and is configured to direct fluid F substantially from the first side 40 of the capacitor 30 to the second side 42. Adjacent the second side 42, the internal cooling channel 32 includes a fourth segment 64, which is perpendicular to the third segment 62, and which extends parallel to the second side 42. Finally, the internal cooling channel 32 includes a fifth segment 66 perpendicular to the fourth segment 64, and configured to direct the fluid F from the fourth segment 64 to the outlet 50. As shown, each segment 58, 60, 62, 64, 66 is parallel to an adjacent one of the front face 36, rear face 38, first side 40, and second side 42. While a plurality of segments are shown, it should be understood that this disclosure extends to other arrangements of the internal cooling channel 32.

In use, fluid F is directed through the internal cooling channel 32. The fluid F flows from the inlet 48, through each of the segments 58, 60, 62, 64, 66, and is expelled out the outlet 50. As generally noted above, the fluid F absorbs heat from the capacitor bulk 56, which thermally conditions the capacitor 30, allowing for increased ripple current handling without exceeding a maximum-allowable operating temperature.

It should be understood that terms such as "front," "rear," "top," "side," "interiorly," etc., relative to a normal attitude of the capacitor and are used for purposes of explanation only, and thus should not be considered otherwise limiting. Further, terms such as "generally," "about," and "substantially" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A capacitor for an inverter of an electrified vehicle, comprising:
    an internal cooling channel having a width dimension and a height dimension, wherein the exterior of the capacitor includes a front face, a rear face, first and second sides, a top, and a bottom, the internal cooling channel includes a plurality of segments, and each segment is parallel to an adjacent one of the front face, rear face, first side, and second side and spaced-apart from the respective adjacent one of the front face, rear face, first side, and second side by an amount substantially equal to the width dimension of the internal cooling channel.

2. The capacitor as recited in claim 1, further comprising a capacitor bulk located interiorly of the internal cooling channel, and wherein the internal cooling channel is located interiorly of an exterior of the capacitor.

3. The capacitor as recited in claim 1, further comprising:
    an inlet and an outlet, the internal cooling channel configured to direct fluid from the inlet to the outlet.

4. The capacitor as recited in claim 1, wherein the height dimension is greater than the width dimension.

5. The capacitor as recited in claim 1, wherein the internal cooling channel is concentric with a perimeter of the capacitor.

6. The capacitor as recited in claim 1, wherein the height dimension of each segment of the internal cooling channel extends perpendicular to the top and bottom and parallel to the respective adjacent one of the front face, rear face, first side, and second side of the capacitor, and wherein the width dimension of each segment of the internal cooling channel extends perpendicular to the respective adjacent one of the front face, rear face, first side, and second side of the capacitor.

7. The capacitor as recited in claim 1, wherein the plurality of segments includes a first segment spaced-apart from the front face by the amount and extending substantially parallel to the front face, a second segment spaced-apart from the first side by the amount and extending substantially parallel to the first side, a third segment spaced-apart from the rear face by the amount and extending substantially parallel to the rear face, a fourth segment spaced-apart from the second side by the amount and extending substantially parallel to the second side, and a fifth segment spaced-apart from the front face by the amount and extending substantially parallel to the front face.

8. The capacitor as recited in claim 7, wherein the first segment extends from an inlet of the internal cooling channel to the second segment, and the fifth segment extends from the fourth segment to an outlet of the internal cooling channel.

* * * * *